United States Patent Office 2,893,977
Patented July 7, 1959

2,893,977

TRIPOLYMER AND STARCH CLAY ADHESIVE COMPOSITION CONTAINING SAME

Tzeng Jiueq Suen, New Canaan, and William Norman Russell, Stamford, Conn., assignors to American Cyanamid Company, New York, N.Y., a corporation of Maine No Drawing. Application November 10, 1955
Serial No. 546,281

12 Claims. (Cl. 260—17.4)

This invention relates to a resinous composition, and particularly to a resinous adhesive composition comprising a tripolymer, starch, and clay and to a method for producing such compositions. It is more particularly directed to a dry or paste composition comprising starch, clay, and a copolymer derived from acrylic monomers.

The presently available adhesives for various purposes, such as in the assembling of corrugated or solid fiberboard, have the disadvantage of either setting too slowly to be of importance commercially; or the adhesive films obtained are so lacking in water resistance that the utility of the structures joined with the adhesives is severely restricted; or the proportion of relatively more expensive resin required in these adhesives is, as a practical matter, excessive and this thereby increases the cost of the adhesive. Various means have been proposed for improving water resistance of adhesives, but most of these methods require the use of agents which are expensive; or else to be effective, the adhesives require heat treatment, which complicates and renders impractical from an expense viewpoint the processes necessary for their use. Furthermore, additives which have been heretofore employed to provide water resistance in making these adhesives, frequently impart instability to the composition, thereby making it less desirable for use in the manufacture of water-resistant multi-ply structures and fiberboard, where the physical properties of the adhesive are critical and must be carefully controlled, as in commercial pasting machines.

Starch adhesives have heretofore been characterized by lack of water resistance, so that their use has been largely restricted. To overcome this shortcoming, various expedients, such as incorporating considerable amounts of urea-formaldehyde resins to impart water resistance to starch adhesives, have been attempted. Unfortunately, the result has generally been an unstable product.

According to the present invention, a resinous composition comprising the polymerization product of (1) from 10 to 35 mole percent of acrylamide or methacrylamide; (2) from 7.5 to 25 mole percent of acrylic acid, methacrylic acid, or the alkaline salts of these acids; and (3) from 55 to 82.5 mole percent of acrylonitrile, or methacrylonitrile, which when made into an aqueous paste with starch and clay, produces a resinous adhesive that has excellent characteristics. Good results are obtained with this copolymer when it is present in amounts of as little as 2 parts by weight, based on the total weight of the solids. The adhesive is found to have excellent water resistance.

The copolymer referred to in the present invention is a polymer represented by a general structure as follows:

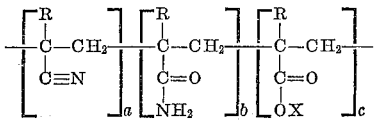

where "X" is a member selected from the group consisting of "H," "Na," "K," "Li," "NH$_4$," and hydrogen in combination with water-soluble tertiary amines, such as triethylamine, trimethylamine, triethanol amine, and the like; and "R" is "H" or "CH$_3$," and where the proportion of (a) is about 55 to 82.5 mole percent; (b) about 10 to 35 mole percent; and (c) about 7.5 to 25 mole percent.

In order that the present invention may be more fully understood, the following examples are set forth for the purposes of illustration only, and any specific enumeration of details should not be interpreted as a limitation, except as expressed in the appended claims.

EXAMPLE 1

Into a suitable reaction vessel fitted with a mechanical stirrer, thermometer, gas inlet tube, reflux condenser, and dropping funnels is charged 433 parts of demineralized water, together with 6 parts of Aerosol OT, which is the dioctyl ester of sodium sulfosuccinic acid; 8.8 parts of polyacrylamide; and 3 parts of 6 normal sulfuric acid. Purging with an inert gas (CO$_2$) is maintained throughout the preparation. A temperature of 10° C.±2° C. is employed. A solution of 26 parts acrylamide, 31.5 parts acrylic acid, and 89.5 parts of de-mineralized water as one stream and 93 parts liquid acrylonitrile monomer as a second stream are charged simultaneously and semicontinuously over a period of about 90 minutes. A solution of 9 parts ammonium persulfate in 70 parts of de-mineralized water and a solution of 4.5 parts of potassium meta-bisulfite in 140 parts of de-mineralized water are also charged simultaneously and semi-continuously during the same 90-minute period. Approximately one hour after the initial monomer catalyst charge, the batch becomes turbid, and the formation of the polymer becomes apparent. As the polymer continues to precipitate, a slurry forms which gradually thickens within about 90 minutes after the final addition is made. An additional 500 parts of de-mineralized water is then added to reduce the viscosity of the slurry. After standing for 30 minutes longer under inert conditions and at the stated temperatures, the batch is allowed to come to room temperature. The reaction product, having a specific viscosity of approximately 4.05, is then dried. The copolymer product obtained can be admixed in proportions as low as 2% by weight with clay, or with clay and starch to produce an adhesive which when mixed with water, has excellent adhesion and water repellency.

EXAMPLE 2

The procedure and formulation employed similar to Example 1 with the exception that the proportion of acrylamide and acrylic acid solution and acrylonitrile is 28.5, 22.1, and 99 parts, respectively. The copolymer has adhesive characteristics similar to those of Example 1.

EXAMPLE 3

Into a suitable reaction vessel fitted with a mechanical stirrer, thermometer, gas inlet tube, reflux condenser, and dropping funnels is charged 1,100 parts of demineralized water. An inert gas atmosphere blanket of CO$_2$, and a temperature of 70° C. to 76° C. is maintained in the reaction vessel throughout the preparation. 33.4 parts of acrylamide, 41.6 parts of acrylic acid, and 120 parts of 20% sodium hydroxide in 130 parts of de-mineralized water providing a solution having a pH of 6.8 is charged semi-continuously, together with 125 parts of acrylonitrile and a catalyst solution of 2 parts ammonium persulfate, in 450 parts of de-mineralized water over a period of about one hour. The batch is heated for an additional two hours, and the batch is then cooled to room temperature. The product has a pH of 6.7 and a Brookfield viscosity at 28° C. of 696 cps. The copolymer makes an excellent adhesive, even when admixed with clay and starch. A good adhesive is formed when small amounts i.e., as low as 2% copolymer, is used.

EXAMPLE 4

The formulation and procedure of Example 3 is employed with the exception that 75 parts of 15% ammonia and 175 parts of de-mineralized water are employed instead of the 120 parts of 20% sodium hydroxide and 130 parts of de-mineralized water. A reaction product having a pH of 6.0 and a Brookfield viscosity at 25° C. of 188 cps. is obtained. The adhesive characteristics are excellent.

The monomers of the instant invention may, if desired, be polymerized in the presence of a portion of the clay to provide a tripolymer of improved consistency and one which promotes better blending in the subsequent mixing with starch and clay. Example 5 illustrates polymerization in the presence of clay.

EXAMPLE 5

Into a suitable reaction vessel fitted with a thermometer, mechanical stirrer, gas inlet tube, condenser, and dropping funnels is charged 317 parts of de-mineralized water; 37.5 parts of clay; 0.5 part of the commercially available emulsifier, Triton X–100, which is a condensation product of ethylene oxide and octyl phenol; 0.5 part of 6 normal sulfuric acid; and a small amount of an anti-foaming agent. Purging with an inert gas, i.e., nitrogen, is maintained throughout the reaction. A temperature of between 30° C. and 35° C. is maintained. A solution of 30 parts acrylamide; 7.5 parts of acrylic acid; and 37.5 parts of acrylonitrile in 16.3 parts of de-mineralized water is charged simultaneously and continuously over a 2-hour period. A catalyst solution of 2.2 parts of ammonium persulfate in 25 parts of de-mineralized water and 1.1 parts of potassium meta-bisulfite in 25 parts of de-mineralized water are charged in the same manner and at the same time as the monomers. The resin-clay slurry is maintained at a temperature of between 25° C. and 30° C. for a period of about 2 hours. The product is then dried in a convenient manner, as by spray drying. Starch-clay adhesives made with this resin have excellent properties.

In addition to the persulfate and persulfate-bisulfite catalytic systems mentioned in the examples, other suitable catalysts may be utilized. Also heat, light, or high energy radiation can be used to effect or to accelerate polymerization of the mixture of comonomers, although under such conditions, the rate of polymerization may be relatively slow. Hence, it is usually preferred to accelerate the polymerization by employing a polymerization catalyst accompanied by heat and/or light. Ultra-violet light is more effective than ordinary light.

The polymerization catalysts which are suitable for use in polymerizing compounds containing an ethylenically unsaturated grouping, specifically a vinyl grouping, can be employed. Among such catalysts are the various organic peroxy catalysts, illustrative examples of which latter are: the dialkyl peroxide, e.g., diethyl peroxide, dipropyl peroxide, dibutyl peroxide; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance, peroxides which commonly are known under such names as acetyl peroxide, propionyl peroixde, malonyl peroxide, succinyl peroxide, benzoyl peroxide, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic per-compounds, e.g., the water-soluble peroxides, peracids and persalts, including hydrogen peroxide, organic peroxides, e.g., diacetyl peroxide, urea peroxide, etc., peracetic acid, the various chlorates, perchlorates, persulfates, percarbonates, perborates, perphosphates, etc., e.g., the ammonium and alkali-metal (sodium, potassium, lithium, etc.), salts of percarbonic, peracetic, perboric, perphosphoric, persulfuric, chloric, perchloric, etc., acids; and water-soluble ferric salts capable of yielding ferric ions, including the various ferric alums, e.g., ferric ammonium sulfate (ferric ammonium alum), ferric sodium sulfate, ferric potassium sulfate, etc. Other so-called "free radical" types of catalysts, e.g., $\alpha,\alpha'$-azodiisobutyro-nitrile, also can be used to accelerate polymerization. The various known "redox" (reduction-oxidation) catalyst systems also can be employed, and are especially adapted for use when the mixed monomers are copolymerized in an aqueous medium.

Examples of reducing activators that are useful are oxygen-containing sulfur compounds which are capable of undergoing oxidation, for instance, sulfur dioxide, the alkali-metal (e.g., sodium, potassium, etc.) bisulfites, hydrosulfites, thiosulfates, sulfurous acid (or compounds which engender sulfurous acid, e.g., alkali-metal sulfites, ethyl and other alkyl sulfites, etc.), various organic sulfinic acids, e.g., p-toluene sulfinic acid, formamidine sulfinic acid, etc.

The copolymerization is preferably conducted under an atmosphere of inert gas, for example, nitrogen, carbon dioxide, helium, and the like, although it may also be carried out under an atmosphere of air.

The temperatures at which the monomers are copolymerized may be varied over a wide range, i.e., under ordinary pressures, temperatures as low as 0° C. and as high as 100° C. may be employed. The use of polymerization temperatures substantially above the boiling point of the mixture of monomers is not precluded, but generally is less desirable because the polymerization reaction then must be carried out in a closed reaction vessel under pressure.

The temperature employed will depend on the nature of the catalyst and its amount and on the reaction times. At lower temperatures a redox catalyst is preferably employed, while at higher temperatures, a single peroxy compound, such as potassium persulfate, can be used conveniently.

The polymerization reaction times will vary with the temperature and the catalyst and amount thereof which is used. A reaction time of from about 0.5 to 24 hours is generally suitable.

The pH of the polymerizing mixture may range between about pH 2 and pH 10. In general at higher pH, the copolymer is more soluble, while at lower pH, the copolymer forms a slurry. Thus, a selection of optimum pH will depend on the form of the product desired.

Where the product is to be dried, any convenient drying means may be employed. Thus, for a liquid or slurry product, spray, drum, or freeze-drying techniques are suitable. For a slurry product, tray drying may also be used.

The copolymer of the present invention is suitable for various applications, for example, paper and textile treatment, film-forming materials, caking and flocculating agent, as a protective colloid, and like uses. It is particularly advantageous as a water-resistant adhesive.

An excellent adhesive composition is made by blending the dried copolymer, or copolymer-clay composition with clay and unswollen starch. An alkali sufficient to provide a pH of between 6 and 11, when the adhesive is mixed with water, and a starch preservative are generally employed in making the starch-clay tripolymer composition. A dry mix of this nature generally comprises from 2 to 40 parts tripolymer, preferably 10 to 20 parts; from 20 to 98 parts clay, preferably 55 to 75 parts. No starch need be employed, although satisfactory adhesive may be made with up to about 40 parts unswollen starch. Preferred results are obtained when 15 to 25 parts of starch are used. The amount of alkali employed depends on the amount and specific characteristics and acidity of the clay and on the degree of neutralization of the carboxyl groups of the resin. The amount of starch preservative is of course determined by the amount of starch in the adhesive mixture. The increase in water resistance, which is advantageously characteristic of the starch-clay resin composition of the instant invention, is realized because of a suspected interaction which takes place between the polymer and the clay, the exact mechanism of which is not known.

The starch employed may be any flour or starchy material, such as wheat flour, corn starch, tapioca starch, sweet potato starch, rice starch, and other commonly available starches and flours.

The clay should preferably be non-alkaline. Non-alkaline clays containing from about 26% to 40% combined alumina ($Al_2O_3$) and having $SiO_2$ to $Al_2O_3$ weight ratio of from about 1 to 2.5 have been found to give good results. The average particle size of the clay should be small enough so that the adhesive forms a smooth homogeneous mixture with water. Fineness of particles is desirable, as it facilitates dispersion of the clay in the water. It is preferred to use a clay having physical and chemical characteristics similar to those of aluminum silicate pigment clays, such as Edgar ASP-900, having the following characteristics:

| Chemical Analysis | | Particle Size | |
|---|---|---|---|
| Ingredients | Percent | Micron Diameter | Percent |
| Combined water | 13.68 | below 0.25 | 5 |
| Silica | 44.20 | 0.25–0.50 | 12 |
| Alumina | 40.14 | 0.50–1 | 20 |
| Iron Oxide | trace | 1–2 | 21 |
| Titanium oxide | 0.40 | 2–5 | 23 |
| Sodium oxide+Potassium oxide | 0.50 | 5–10 | 12 |
| Calcium oxide+Magnesium oxide | 0.04 | 10–35 | 7 |
| pH—4.4–5.5. | | | |

In addition to the copolymer, starch, and clay, it is preferred to include in the compositions of this invention a small amount of a preservative to prevent deterioration of the starch. Any preservative which is compatible with the adhesive and does not alter its physical characteristics may be used. Among such effective agents are pentachlorophenol, dodecyl dimethyl benzyl ammonium chloride, zinc or iron-dimethyldithiocarbamate, tetramethylthiuram disulfide, salicylanilide, phenylmercury oleate, phenol, and cresols. The amount of such an agent used advantageously may be from 0.01% to 2.0% by weight in the dry adhesive.

In preparing a liquid or paste adhesive from a dry composition, the dried mix is stirred in water and heated until the starch swells, and the tripolymer is intimately mixed in the paste. The proportion of water employed should be preferably such as will give a paste having about 20% solids and a pH within the range of about 6 to 11 and preferably between 8 and 10.

The adhesive prepared in this manner may be employed in uniting cellulosic plies, to make products, such as paperboard, ply board, box board, and the like. These products are characterized by their remarkable resistance to water. Plies united with the adhesive of the present invention are capable of being submerged in water for prolonged periods with relatively minor loss of strength at the bond.

Compounding of the adhesive of this invention will be more readily understood by the preparation of the adhesive utilizing the copolymer according to the following example:

EXAMPLE 6

4 parts of tripolymer, 60 parts of clay, 36 parts of starch, and 4 parts of $(NH_4)_2CO_3$ are added to 400 parts water and are intimately blended for about 15 minutes; thereafter the mixture is heated to a temperature of 85° C. to 95° C. and held at this temperature for approximately 15 minutes, while agitating. The pH is adjusted to between 8.5 and 9.5. The adhesive is now ready for use. It is preferably applied to a temperature of approximately 60° C.

Adhesives made according to the procedure of Example 6 employing each of the tripolymers of Example 1 to Example 6, were tested in the following manner:

3½-inch squares of 2-ply commercially available jute paperboard were coated with approximately 0.05 grams per square inch of adhesive. The adhesive was brushed on the face side of a 3½- by 7-inch strip of the paper and placed against the backing side of a similar sized strip. The joined strip was passed 3 times through a pair of squeeze rolls, adjusted so as to provide slight pressure but not squeeze out the paste. Samples were aged 30 minutes and cut in half. One of the halves is tested immediately for tack and dry-strength by flexing the edges and then separating the plies. The other half is immersed in water at 75° F. for 16 to 24 hours and then tested by separating the plies in the same manner. Ratings are noted in percentages of paper failure at the glue line. 100% failure indicates optimum strength in the adhesive composition. Results obtained are presented in Table I.

*Table I*

| Example | Ratio | | | Percent Solids | pH | Percent Paper Failure | |
|---|---|---|---|---|---|---|---|
| | Resin | Clay | Starch | | | Dry | Wet |
| 1 | 4 | 60 | 36 | | 9.1 | 100 | 100 |
| 2 | 4 | 60 | 36 | | 9.2 | 100 | 100 |
| 3a | 2 | 60 | 38 | 20 | 9.7 | 90 | 60 |
| 3b | 3 | 60 | 37 | 20 | 9.6 | 95 | 100 |
| 3c | 4 | 60 | 36 | 20 | 9.7 | 100 | 100 |
| 3d | 10 | 60 | 30 | 20 | 7.0 | 100 | 100 |
| 4a | 2 | 60 | 38 | 20 | 9.4 | 100 | 25 |
| 4b | 3 | 60 | 37 | 20 | 9.8 | 100 | 100 |
| 4c | 7 | 60 | 33 | 20 | 8.0 | 100 | 100 |
| 5 | 3 | 60 | 37 | 20 | 9.3 | 85 | 100 |
| | 0 | 50 | 50 | 18.4 | | 100 | 5 |
| | 0 | 60 | 40 | 20 | | 100 | 2 |
| | 0 | 80 | 20 | 20 | | 85 | 0 |

It will be understood that various modifications in compositions and processes are possible without departing from the scope of the present invention.

1. A copolymer resinous composition having water-resistant adhesive properties comprising the polymerization product of a mixture of monomers having the general formula (a)
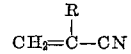
$$CH_2=\overset{R}{\underset{|}{C}}-CN$$

(b)
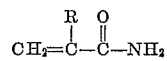
$$CH_2=\overset{R}{\underset{|}{C}}-\overset{O}{\underset{\|}{C}}-NH_2$$

and (c)
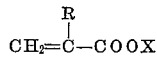
$$CH_2=\overset{R}{\underset{|}{C}}-COOX$$

wherein "R" is a member selected from the group consisting of "H" and "$CH_3$" and "X" is a member selected from the class consisting of "H," "Na," "K," "Li," "$NH_4$," and "hydrogen in combination with water-soluble tertiary amines," wherein the relative molar proportions of (a), (b), and (c) are within the ranges of from about 55% to 82.5%, 10% to 35%, and 7.5% to 25%, respectively.

2. The composition of claim 1 wherein (a) is acrylonitrile, (b) is acrylamide, and (c) is acrylic acid.

3. The composition of claim 1 wherein (a) is acrylonitrile, (b) is acrylamide, and (c) is sodium acrylate.

4. The composition of claim 1 wherein (a) is acrylonitrile, (b) is acrylamide, and (c) is ammonium acrylate.

5. An adhesive composition comprising (1) about 2 to 40 parts of a tripolymer comprising the polymerization product of a mixture of (a) from about 55 to 82.5 mole percent of a monomer having the general formula $$CH_2=\overset{R}{\underset{|}{C}}-CN$$

(b) from about 10 to 35 mole percent of a monomer having the general formula $$CH_2=\overset{R}{\underset{|}{C}}-\overset{O}{\underset{\|}{C}}-NH_2$$

(c) from about 7.5 to 25 mole percent of a monomer having the general formula $$CH_2=\overset{R}{\underset{|}{C}}-COOX$$

wherein "R" is a member selected from the group consisting of "H" and "CH$_3$" and "X" is a member selected from the class consisting of "H," "Na," "K," "Li," "NH$_4$," and "hydrogen in combination with water-soluble tertiary amines"; (2) from about 20 to about 98 parts of kaolinitic non-alkaline, clay; and (3) up to about 40 parts of unswollen starch, said parts being parts by weight and the total parts of the main constituents being 100.

6. An adhesive composition comprising (1) about 10 to 20 parts of a tripolymer comprising the polymerization product of the constituents (a) from about 55 to 82.5 mole percent acrylonitrile; (b) from about 10 to 35 mole percent acrylamide; (c) from about 7.5 to 25 mole percent of acrylic acid; (2) from about 55 to about 75 parts of kaolinitic non-alkaline clay; and (3) from 15 to about 25 parts of unswollen starch, said parts being parts by weight and the total parts of the main constituents being 100.

7. An adhesive composition comprising (1) about 10 to 20 parts of a tripolymer comprising the polymerization product of the constituents (a) from about 55 to 82.5 mole percent acrylonitrile, (b) from about 10 to 35 mole percent acrylamide, (c) from about 7.5 to 25 mole percent of methacrylic acid; (2) from about 55 to about 75 parts of kaolinitic non-alkaline clay; and (3) from 15 to about 25 parts of unswollen starch, said parts being parts by weight and the total parts of the main constituents being 100.

8. An adhesive composition comprising (1) about 10 to 20 parts of a tripolymer comprising the polymerization product of (a) from about 55 to 82.5 mole percent acrylonitrile, (b) from about 10 to 35 mole percent methacrylamide, (c) from about 7.5 to 25 mole percent of acrylic acid; (2) from about 55 to about 75 parts of kaolinitic non-alkaline clay; and (3) from 15 to about 25 parts of unswollen starch, said parts being parts by weight and the total parts of the main constituents being 100.

9. A tripolymer adhesive composition comprising (1) about 10 to 20 parts of a tripolymer comprising the polymerization product of (a) from about 55 to 82.5 mole percent acrylonitrile, (b) from about 10 to 35 mole percent methacrylamide, (c) from about 7.5 to 25 mole percent of methacrylic acid; (2) from about 55 to about 75 parts of kaolinitic non-alkaline clay; and (3) from 15 to about 25 parts of unswollen starch, said parts being parts by weight and the total parts of the main constituents being 100.

10. A liquid adhesive composition comprising (1) about 10 to 20 parts of a tripolymer comprising the polymerization product of the main constituents (a) from about 55 to 82.5 mole percent acrylonitrile, (b) from about 10 to 35 mole percent acrylamide, (c) from about 7.5 to 25 mole percent of acrylic acid; (2) from about 55 to about 75 parts of kaolinitic non-alkaline clay; (3) from about 15 to about 25 parts of unswollen starch, said parts being parts by weight and the total parts of the main constituents being 100; and (4) sufficient water to impart the desired consistency.

11. A liquid adhesive composition comprising (1) about 10 to 20 parts of a tripolymer comprising the polymerization product of the main constituents (a) from about 55 to 82.5 mole percent acrylonitrile, (b) from about 10 to 35 mole percent methacrylamide, (c) from about 7.5 to 25 mole percent of acrylic acid; (2) from about 55 to about 75 parts of kaolinitic non-alkaline clay; (3) from about 15 to about 25 parts of unswollen starch, said parts being parts by weight and the total parts of the main constituents being 100; and (4) sufficient water to impart the desired consistency.

12. A liquid adhesive composition comprising (1) about 10 to 20 parts of a tripolymer comprising the polymerization product of the main constituents (a) from about 55 to 82.5 mole percent acrylonitrile, (b) from about 10 to 35 mole percent acrylamide, (c) from about 7.5 to 25 mole percent of methacrylic acid; (2) from about 55 to about 75 parts of kaolinitic non-alkaline clay; (3) from about 15 to about 25 parts of unswollen starch, said parts being parts by weight and the total parts of the main constituents being 100; and (4) sufficient water to impart the desired consistency.

References Cited in the file of this patent

UNITED STATES PATENTS

| | | |
|---|---|---|
| 2,343,093 | Smith | Feb. 29, 1944 |
| 2,436,926 | Jacobson | Mar. 2, 1948 |
| 2,632,704 | Lowe et al. | Mar. 24, 1953 |
| 2,653,140 | Wentworth | Sept. 22, 1953 |
| 2,734,888 | D'Alelio | Feb. 14, 1956 |